(12) United States Patent
Toyoda et al.

(10) Patent No.: US 6,700,605 B1
(45) Date of Patent: Mar. 2, 2004

(54) APPARATUS FOR MONITORING

(75) Inventors: Tooru Toyoda, Tokyo (JP); Motohiro Misawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/311,140

(22) Filed: May 13, 1999

(30) Foreign Application Priority Data

May 15, 1998 (JP) .......................................... 10-133036

(51) Int. Cl.[7] .............................................. H04N 5/232
(52) U.S. Cl. .............................. 348/211.13; 348/231.5; 348/143; 348/159
(58) Field of Search .................. 348/207.99, 207.1, 348/211.99, 211.3, 211.4, 211.5, 211.6, 211.8, 211.9, 211.11, 211.12, 211.13, 211.14, 143, 159, 231.99, 231.3, 231.4, 231.5, 231.6, 231.9, 152, 153, 154, 333.01, 333.02, 333.04, 333.12; 386/117, 109

(56) References Cited

U.S. PATENT DOCUMENTS

| 5,034,804 A | * | 7/1991 | Sasaki et al. ............. 348/231.4 |
| 5,526,041 A | * | 6/1996 | Glatt .......................... 348/143 |
| 5,583,796 A | | 12/1996 | Reese |
| 5,982,418 A | * | 11/1999 | Ely .............................. 348/153 |
| 6,133,941 A | * | 10/2000 | Ono ......................... 348/14.05 |
| 6,452,628 B2 | * | 9/2002 | Kato et al. ............. 348/333.12 |

FOREIGN PATENT DOCUMENTS

| EP | 0690628 A1 | 1/1996 |
| EP | 0712240 A1 | 5/1996 |
| EP | 0749243 A1 | 12/1996 |
| EP | 0784406 A2 | 7/1997 |
| JP | 3280120 | 12/1991 |
| JP | 4105140 | 4/1992 |
| JP | 4117598 | 4/1992 |
| WO | 9614587 | 5/1996 |
| WO | 9740624 | 10/1997 |

OTHER PUBLICATIONS

EPO Search Report dated Jul. 21, 1999.

* cited by examiner

*Primary Examiner*—Tuan Ho
(74) *Attorney, Agent, or Firm*—Stevens, Davis, Miller & Mosher, LLP

(57) ABSTRACT

In a monitoring device, a camera controller controls each of cameras, a display controller controls at least one display to show thereon a picture taken by at least one of the cameras to be monitored by an operator and controls a picture recorder to record the picture therein, and a condition data recording controller controls a recording of at least one of a condition data of the at least one of the cameras while taking the picture and a condition data of the display while showing the picture, into a condition data memory device.

22 Claims, 2 Drawing Sheets

APPARATUS FOR MONITORING

BACKGROUND OF THE INVENTION AND RELATED ART STATEMENT

The present invention relates to an apparatus for controlling a relationship between at least one monitoring display and a plurality of cameras, and a monitoring device comprising a camera controller and a display controller.

In a prior art monitoring device, a picture taken by a camera is recorded onto a video tape so that the picture recorded on the video tape is reproduced when an abnormal condition recorded on the picture needs to be inspected in detail.

OBJECT AND SUMMARY OF THE INVENTION

An object of the present invention is to provide an apparatus for controlling a relationship between at least one monitoring display and a plurality of cameras, and a monitoring device including controllers for the display and cameras, by which apparatus and device at least one of a condition data of the at least one of the cameras while taking the picture and a condition data of the display while showing the picture is reproduced while a recorded picture is reproduced to be inspected in detail so that a correspondence between the picture and the condition data obtained when taking the picture is knowable to be also inspected.

In an apparatus for setting, that is, connecting an electric relationship among at least one display, a plurality of cameras and a picture recorder so that a picture taken by at least one of the cameras is shown on the display to be monitored by an operator and is recorded in the picture recorder, according to the present invention, since the apparatus comprises a condition data recording controller adapted to control a recording of at least one of a condition data of the at least one of the cameras while taking the picture and a condition data of the display while showing the picture, into a condition data memory device such as a fixed memory device fixed in the apparatus or a removable memory device removable from the apparatus, the condition data is readable from the condition data memory device when the recorded picture is reproduced so that the correspondence between the picture and the condition data obtained when taking the picture is knowable to be inspected.

The condition data of the at least one of the cameras while taking the picture may include at least one of a data corresponding to, that is, identifying a position of the at least one of the cameras taking the picture, a data corresponding to, that is, identifying a focussing direction in which the at least one of the cameras is directed and focussed to take the picture, a data corresponding to, that is, identifying a focal distance of the at least one of the cameras, a data corresponding to, that is, identifying a zooming degree of the at least one of the cameras, and a data corresponding to, that is identifying an exposure degree of the at least one of the cameras.

The condition data of the display while showing the picture may include at least one of a data corresponding to, that is, identifying which of the cameras is selected as the at least one of the cameras to take the picture, a data corresponding to, that is, identifying who is the operator monitoring the picture and a data corresponding to, that is, identifying by what device an alarm signal is originally generated. Who is the operator monitoring the picture may be inputted into the below mentioned matrix switcher as an ID code.

When the apparatus comprises a plurality of the displays, the condition data of the display while showing the picture may include at least one of a data corresponding to, that is, identifying which of the cameras is selected as the at least one of the cameras to take the picture to be shown on each of the displays and a data corresponding to, that is, identifying who is the operator monitoring the picture shown on each of the displays.

When a plurality of the condition data obtained in accordance with a proceeding of the time are recorded in the condition data memory device and a plurality of the pictures (including a moving picture, such as video picture) obtained in accordance with the proceeding of the time are recorded in the picture recorder, a data corresponding to, that is, identifying the proceeding of the time along which the condition data and the pictures are obtained is recorded in each of the condition data memory device and the picture recorder so that a harmonization or clear correspondence in reading out or reproducing the condition data and the pictures thereamong is achieved. When a data corresponding to, that is, identifying the time at which the condition data is obtained is recorded in the condition data memory device, and a data corresponding to, that is, identifying the time at which the picture is obtained is recorded in the picture recorder, a correspondence between the condition data and the picture is clearly knowable.

At least one of the position of the at least one of the cameras taking the picture, the focussing direction in which the at least one of the cameras is directed and focussed to take the picture, and the zooming degree of the at least one of the cameras may be controlled on the basis of, that is, along with a predetermined control instruction by the apparatus while a recording of a data corresponding to, that is, identifying it (controlled one, or the at least one of the position of the at least one of the cameras, the focussing direction, and the zooming degree) is controlled or performed by the condition data recording controller.

At least one of the cameras may be selected to take the picture on the basis of a predetermined control instruction while a recording of a data corresponding to, that is, identifying the selected at least one of the cameras as the condition data into the condition data memory device is controlled or performed by the condition data recording controller. The predetermined control instruction (including a set of sequential control instructions for the display(s) and/or the cameras) may be set and recorded in the below mentioned matrix switcher or may be supplied from another control device other than the apparatus.

The recorded condition data may be read out from the condition data memory device while the picture is reproduced from the picture recorder so that a correspondence between the picture and the condition data is knowable to be clearly inspected in detail.

At least one of a picture recording start, a change from an intermittent picture recording with a relatively long time no-recording period between subsequent recordings of the pictures to a continuous picture recording with a relatively short no-recording time period or without no-recording time period between the subsequent recordings of the pictures and a change from a relatively low recording density to a relatively high recording density, of the picture recorder may be triggered by an alarm signal caused by at least one of a motion shown in the picture, a sensor's detection of a change in a place to be monitored and an emergency signal from an outside of the apparatus.

At least one of the at least one of the cameras for taking the picture, a position of the at least one of the cameras, a focussing direction in which the at least one of the cameras is directed and focussed to take the picture, and a zooming degree of the at least one of the cameras may be changed in accordance with a proceeding of the time, while a recording of a combination of a data corresponding to, that is, identifying it (changed one or at least one of the at least one of the cameras, the position of the at least one of the cameras, the focussing direction, and the zooming degree) and the proceeding of the time as the condition data into the condition data memory device is controlled by the condition data recording controller.

The apparatus may further include a remote controller for determining at least one of a position of the at least one of the cameras taking the picture, a focussing direction in which the at least one of the cameras is directed and focussed to take the picture, a zooming degree of the at least one of the cameras, and which of the cameras is selected as the at least one of the cameras to take the picture. The at least one of the position of the at least one of the cameras taking the picture, the focussing direction in which the at least one of the cameras is directed and focussed to take the picture, the zooming degree of the at least one of the cameras, and which of the cameras is selected as the at least one of the cameras to take the picture may be included by the predetermined control instruction and be changed by the remote controller. The changed at least one of the position of the at least one of the cameras taking the picture, the focussing direction in which the at least one of the cameras is directed and focussed to take the picture, the zooming degree of the at least one of the cameras, and which of the cameras is selected as the at least one of the cameras to take the picture may be stored in the condition data memory device as the condition data. The remote controller is preferably arranged adjacent to the display.

The cameras may be electrically connected through a daisy-chain electric connection.

The condition data memory device may be prevented from being included by the claimed apparatus so that the condition data is transmitted out of the apparatus to the condition data memory device to be stored therein, or alternatively the condition data recording controller may include the condition data memory device as a part of the claimed apparatus.

The picture may be stored in the picture recorder which is prevented from being included by the claimed apparatus so that a data corresponding to, that is, identifying the picture is transmitted out of the apparatus to the picture recorder to be stored therein, or alternatively the picture recorder may be included by the claimed apparatus.

The claimed monitoring device may comprise a camera controller adapted to control a movement of each of the cameras, and a display controller adapted to control the at least one display to show thereon the picture taken by the at least one of the cameras selected by the operator or selected along a predetermined instruction for camera (including a set of sequential instructions for camera) to be monitored by the operator and adapted to control the picture recorder to record therein the picture, in addition to the condition data recording controller (claimed as a part of the apparatus) adapted to control the recording of the at least one of the condition data of the at least one of the cameras while taking the picture and the condition data of the display while showing the picture, into the condition data memory device.

DETAILED DESCRIPTION OF PREFERRED EMBODIMENTS

Figure 1:
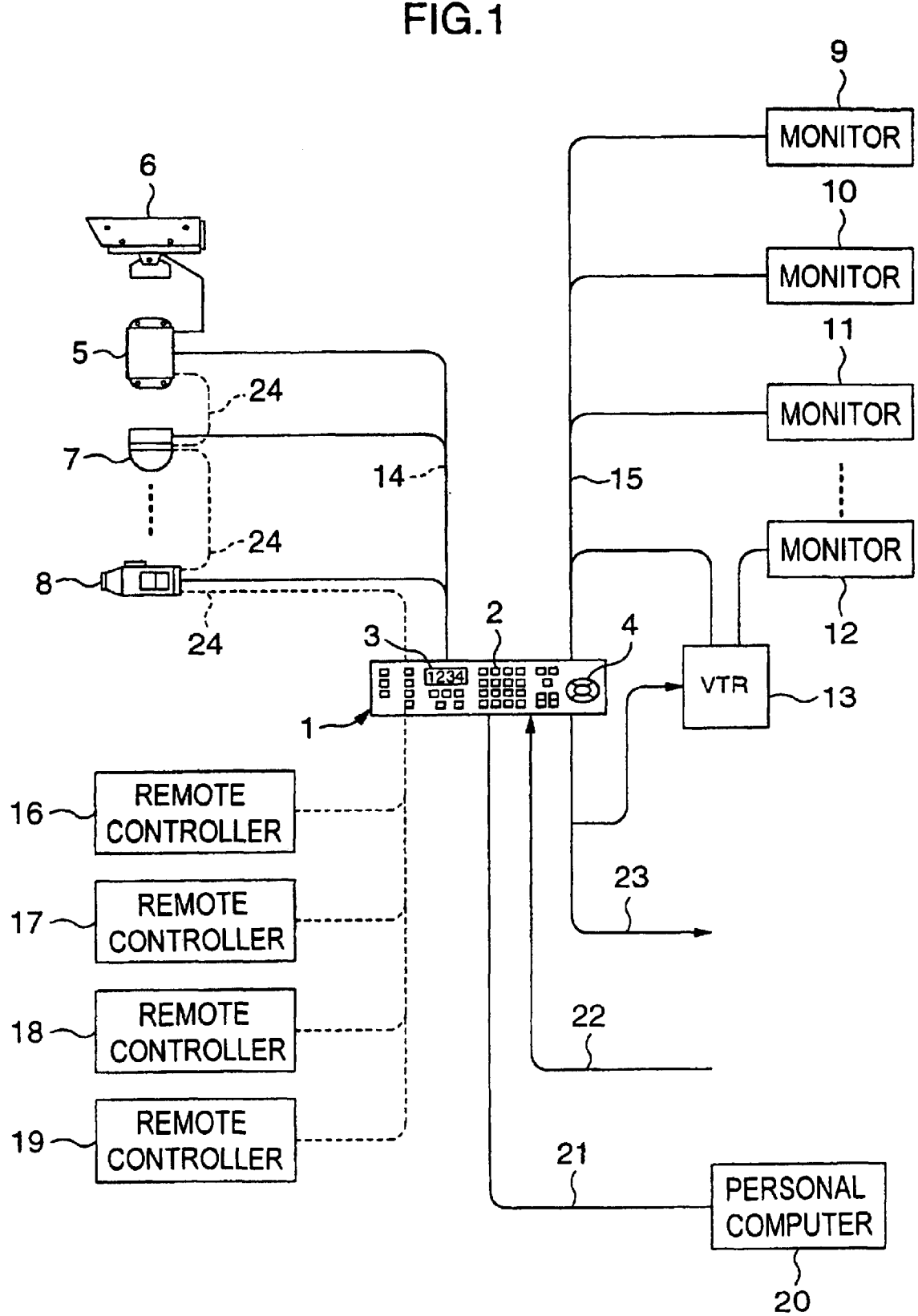
FIG. 1 is a schematic view showing a monitoring device according to the present invention.

As shown in FIG. 1, a matrix switcher 1 having input buttons 2, an indication area 3, an input dial 4 and the like is connected to a camera 6 driven on a camera driver 5 rotationally and/or along a guide path, a camera 7 rotatable for a full circle detecting range, a camera 8 whose focussing direction is fixed, and the like through a data line 14 for inputting a data corresponding to a picture taken by at least one of the cameras to the matrix switcher 1 and through a data line 24 as a daisy-chain electric connection for controlling an operation of each of the cameras. In the daisy-chain electric connection as an electric connection in series, a data for controlling the operation (for example, the focussing direction, an iris opening degree, a focal distance, an on-off of a picture taking and the like) of each of the cameras is transmitted with an identification code corresponding to each of the cameras. The matrix switcher 1 is further connected electrically to displays 9–12 and a video tape recorder (VTR as the claimed picture recorder) 13 through a data line 15 for an operation of each of the displays 9–12 and VTR 13. The cameras 6–8, displays 9–12 and VTR 13 may be controlled from any of remote controllers 16–19 through a wireless communication between the matrix switcher 1 and the any of the remote controllers 16–19. The cameras 6–8, displays 9–12 and VTR 13 may be controlled from a personal computer 20 through a data line 21 and the matrix switcher 1. An input alarm signal is input into the matrix switcher 1 through a data line 22 and an output alarm signal is output from the matrix switcher 1 through a data line 21. The input alarm signal is generated when an undesirable condition (for example, an intrusion of an undesirable person into a space to be monitored) is detected by a motion in the picture, an emergency signal from a main management system, a sensor (for example, a temperature sensor) or the like.

Figure 2:
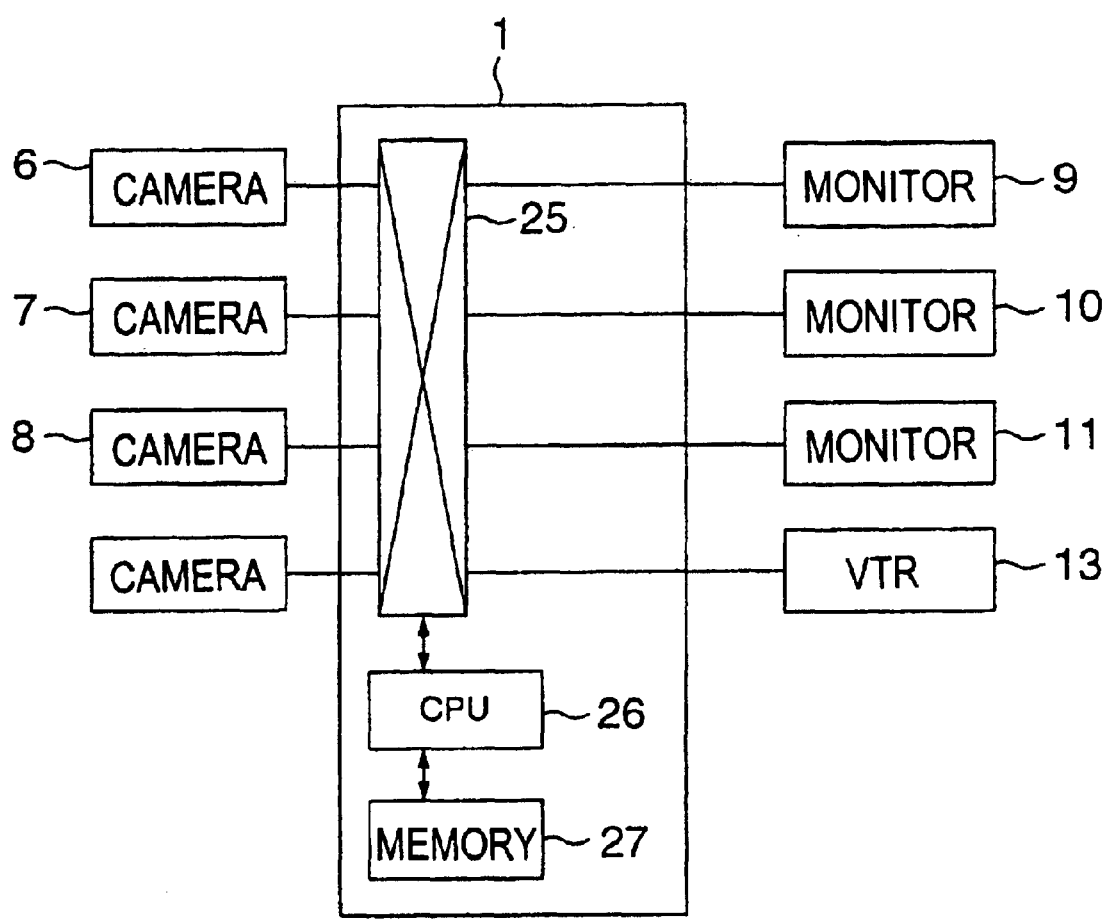
FIG. 2 is a schematic view showing a matrix switcher used in the monitoring device.

The matrix switcher 1 for setting and controlling the operation of each of the cameras 6–8, displays 9–12 and VTR 13 and a transmission of a data corresponding to the picture from the cameras 6–8 to the displays 9–12 and VTR 13 may be named as a video switcher or a controller. As shown in FIG. 2, the matrix switcher 1 includes a data transmission switching device 25 (for controlling or electrically connecting a relationship between at least one of the display and a plurality of the cameras so that the picture taken by at least one of the cameras is shown on the display to be monitored by an operator and is recorded in a picture recorder such as VTR, CD-ROM, DVD or the like) and a CPU 26 as the claimed camera controller and display controllers for controlling the data transmission switching device 25 and the claimed condition data recording controller. The data transmission switching device 25 may be included by the claimed apparatus, and may be controlled by another apparatus not included by the claimed apparatus. A memory 27 as the claimed condition data memory device for storing therein the claimed condition data may be included by the matrix switcher 1, or alternatively may operate as an independent recording device other than or independent of the matrix switcher 1.

The focussing direction in which each of the cameras 6–8 is directed and focussed, the focal distance of each of the cameras 6–8, a shutter speed of each of the cameras 6–8 and the like is determined or set through the matrix switcher 1, and a relationship in data transmission between the each of the cameras 6–8 and each of the displays 9–12 and VTR 13 is determined or set through the matrix switcher 1 by operating the input buttons 2 and/or the input dial 4. These determinations or setting may be performed by the any of remote controllers 16–19 through the matrix switcher 1, and at least a part of data corresponding to or identifying these determinations or setting are stored in the memory 27 as the claimed condition data.

A sequential (for example, proceeding with a time elapse) control of the determinations or setting and/or a start time thereof may be varied in accordance with second, minute, hour, season, date, day of week, month, year or the like on which the sequential control is performed. The variation may be stored in the memory 27 as the claimed condition data.

If an operator monitoring the picture on each of the displays 9–12 operates any of the cameras 6–8 for changing a picture taking condition thereof such as the focussing direction, the focal distance, the shutter speed or the like as the condition data of camera, operates any of the displays 9–12 for changing which of the cameras 6–8 takes the picture to be shown on the any of the displays 9–12 as the condition data of display, and/or varies the predetermined sequential control for the condition data, the modified condition data of the cameras 6–8 and/or the displays 9–12 modified by the operator is stored in the memory 27 as the claimed condition data.

The condition data may be recorded in relation to the time (for example, an absolute time of second, minute, hour, season, date, day of week, month and year, or incremental time from a start of the picture taking and displaying).

Data or signal of the picture from the matrix switcher 2 may be transmitted to the VTR 13 after passing through each of the displays 9–12, or may be transmitted to each of the displays 9–12 after passing through the VTR 13. The VTR 13 as the claimed picture recorder may be replaced by CD-ROM drive or DVD drive.

When the input alarm signal is input into the matrix switcher 2 through the data line 22, a change of the VTR 13 from an intermittent picture recording to a continues picture recording, from a normal density recording to a high-density recording, and/or from a moratorium of recording to a restart of recording is instructed by the matrix switcher 2.

What is claimed is:

1. An apparatus for setting a relationship among at least one display, a plurality of cameras and a picture recorder so that a picture taken by at least one of the cameras is shown on the display to be monitored by an operator and is recorded in the picture recorder, wherein the apparatus comprises a condition data recording controller operable to control a recording of at least one of a condition data of the at least one of the cameras while taking the picture and a condition data of the display while showing the picture, into a condition data memory device such that the condition data is readable from the condition data memory device when the recorded picture is reproduced to enable correspondence between the picture and the condition data obtained when taking the picture to be known.

2. An apparatus according to claim 1, wherein the condition data of the at least one of the cameras while taking the picture includes at least one of a data corresponding to a position of the at least one of the cameras taking the picture, a data corresponding to a focussing direction in which the at least one of the cameras is directed and focussed to take the picture, a data corresponding to a focal distance of the at least one of the cameras, a data corresponding to a zooming degree of the at least one of the cameras, and a data corresponding to an exposure degree of the at least one of the cameras.

3. An apparatus according to claim 1, wherein the condition data of the display while showing the picture includes at least one of a data corresponding to which of the cameras is selected as the at least one of the cameras to take the picture, a data corresponding to who is the operator monitoring the picture and a data corresponding to by what device an alarm signal is originally generated.

4. An apparatus according to claim 1, wherein the apparatus comprises a plurality of the displays, and the condition data of the display while showing the picture includes at least one of a data corresponding to which of the cameras is selected as the at least one of the cameras to take the picture to be shown on each of the displays and a data corresponding to who is the operator monitoring the picture shown on each of the displays.

5. An apparatus according to claim 1, wherein a plurality of the condition data obtained in accordance with a proceeding of the time are recorded in the condition data memory device, a plurality of the pictures obtained in accordance with the proceeding of the time are recorded in the picture recorder, and a data corresponding to the proceeding of the time along which the condition data and the pictures are obtained is recorded in each of the condition data memory device and the picture recorder.

6. An apparatus according to claim 1, wherein a data corresponding to the time at which the condition data is obtained is recorded in the condition data memory device, and a data corresponding to the time at which the picture is obtained is recorded in the picture recorder.

7. An apparatus according to claim 1, wherein at least one of a position of the at least one of the cameras taking the picture, a focussing direction in which the at least one of the cameras is directed and focussed to take the picture, and a zooming degree of the at least one of the cameras is controlled on the basis of a predetermined control instruction while a recording of a data corresponding to it as the condition data is controlled by the condition data recording controller.

8. An apparatus according to claim 1, wherein at least one of the cameras is selected to take the picture on the basis of a predetermined control instruction while a recording of a data corresponding to the selected at least one of the cameras as the condition data is controlled by the condition data recording controller.

9. An apparatus according to claim 1, wherein the recorded condition data is read from the condition data memory device while the picture is reproduced from the picture recorder so that a correspondence between the picture and the condition data is knowable.

10. An apparatus according to claim 1, wherein at least one of the at least one of the cameras for taking the picture, a position of the at least one of the cameras, a focussing direction in which the at least one of the cameras is directed and focussed to take the picture, and a zooming degree of the at least one of the cameras is changed in accordance with a proceeding of the time, while recordings of a data corresponding to it and the proceeding of the time as the condition data are controlled by the condition data recording controller.

11. An apparatus according to claim 1, further includes a remote controller for determining at least one of a position of the at least one of the cameras taking the picture, a focussing direction in which the at least one of the cameras is directed and focussed to take the picture, a zooming degree of the at least one of the cameras, and which of the cameras is selected as the at least one of the cameras to take the picture.

12. An apparatus according to claim 11, wherein the remote controller is arranged adjacent to the display.

13. An apparatus according to claim 1, wherein the cameras are electrically connected through a daisy-chain electric connection.

14. An apparatus according to claim 1, wherein the condition data memory device is prevented from being included by the apparatus no that the condition data is transmitted out of the apparatus to the condition data memory device to be stored therein.

15. An apparatus according to claim 1, wherein the condition data recording controller includes the condition data memory device.

16. An apparatus according to claim 1, wherein the picture is for being stored in the picture recorder which is prevented from being included by the apparatus so that a data showing the picture is transmitted out of the apparatus to the picture recorder to be stored therein.

17. An apparatus according to claim 1, wherein the picture recorder is included by the apparatus.

18. A monitoring device, comprising, a camera controller operable to control each of cameras, a display controller operable to control at least one display to show thereon a picture taken by at least one of the cameras to be monitored by an operator and operable to control a picture recorder to record therein the picture, and a condition data recording controller operable to control a recording of at least one of a condition data of the at least one of the cameras while taking the picture and a condition data of the display while showing the picture, into a condition data memory device in such a manner that the condition data is readable from the condition data memory device when the recorded picture is reproduced so that the correspondence between the picture and the condition data obtained when taking the picture is knowable.

19. A monitoring device according to claim 18, wherein the condition data of the at least one of the cameras while taking the picture includes at least one of a data corresponding to a position of the at least one of the cameras taking the picture, a data corresponding to a focussing direction in which the at least one of the cameras is directed and focussed to take the picture, a data corresponding to a focal distance of the at least one of the cameras, a data corresponding to a zooming degree of the at least one of the cameras, and a data corresponding to an exposure degree of the at least one of the cameras.

20. A monitoring device according to claim 18, wherein the condition data of the display while showing the picture includes at least one of a data corresponding to which of the cameras is selected as the at least one of the cameras to take the picture, a data corresponding to who is the operator monitoring the picture and a data corresponding to by what device an alarm signal is originally generated.

21. An apparatus for setting a relationship among at least one display, a plurality of cameras and a picture recorder so that a picture taken by at least one of the cameras is shown on the display to be monitored by an operator and is recorded in the picture recorder, wherein the apparatus comprises a condition data recording controller operable to control a recording of at least one of a condition data of the at least one of the cameras while taking the picture and a condition data of the display while showing the picture, into a condition data memory device, wherein at least one of a change from an intermittent picture recording with a relatively long time period between subsequent recordings of the pictures to a continuous picture recording with a relatively short time period between the subsequent recordings of the pictures and a change from a relatively low recording density to a relatively high recording density, of the picture recorder is triggered by an alarm signal caused by at least one of a motion shown in the picture, a detection of a change in a place to be monitored and an emergency signal from an outside of the apparatus.

22. A monitoring device, comprising:

a camera controller operable to control each of cameras;

a display controller operable to control at least one display to show thereon a picture taken by at least one of the cameras to be monitored by an operator and operable to control a picture recorder to record therein the picture; and a condition data recording controller operable to control a recording of at least one of a condition data of the at least one of the cameras while taking the picture and a condition data of the display while showing the picture, into a condition data memory device, wherein:

at least one of a change from an intermittent picture recording with a relatively long time period between subsequent recordings of the pictures to a continuous picture recording with a relatively short time period between the subsequent recordings of the pictures and a change from a relatively low recording density to a relatively nigh recording density, of the picture recorder is triggered by an alarm signal caused by at least one of a motion shown in the picture, a detection of a change in a place to be monitored and an emergency signal from an outside of the apparatus.

* * * * *